United States Patent [19]

Kroener et al.

[11] Patent Number: 4,912,960
[45] Date of Patent: Apr. 3, 1990

[54] AUTOMATIC PRECISION STAMPING PRESS AND METHOD FOR CHANGING TOOLS

[75] Inventors: Joseph Kroener, Schwabach; Thomas Hartwig, Erlangen, both of Fed. Rep. of Germany; Helmut Messner, Arbon, Switzerland

[73] Assignee: Siemens Aktiengesellschaft, Berlin and Munich, Fed. Rep. of Germany

[21] Appl. No.: 204,510

[22] Filed: Jun. 9, 1988

[30] Foreign Application Priority Data

Jun. 10, 1987 [DE] Fed. Rep. of Germany ....... 3719370

[51] Int. Cl.$^4$ .............................................. B21D 37/14
[52] U.S. Cl. ........................................ 72/462; 72/481
[58] Field of Search .................. 72/481, 462; 83/387, 83/640; 269/47

[56] References Cited

U.S. PATENT DOCUMENTS

| | | | |
|---|---|---|---|
| 3,229,791 | 1/1966 | Soman | 72/462 |
| 3,638,473 | 2/1972 | McElroy | 72/462 |
| 3,881,343 | 5/1975 | Ducate | 72/462 |
| 4,473,346 | 9/1984 | Hehl | 72/462 |
| 4,520,919 | 6/1985 | Keitaro | 72/462 |
| 4,790,174 | 12/1988 | Wendland | 72/462 |

FOREIGN PATENT DOCUMENTS

| | | | |
|---|---|---|---|
| 0035026 | 3/1983 | Japan | 72/482 |
| 0127935 | 7/1984 | Japan | 72/482 |
| 0127936 | 7/1984 | Japan | 72/482 |
| 0127937 | 7/1984 | Japan | 72/482 |
| 1189545 | 11/1985 | U.S.S.R. | 72/482 |

Primary Examiner—David Jones
Attorney, Agent, or Firm—Kenyon & Kenyon

[57] ABSTRACT

In an automatic stamping press with an exchangeable tool, the guide of the press plunger and the press table is utilized for guiding the tools. To this end, guideless tools with an upper tool part and a lower tool part are fastened as separate tool halves directly to the press plunger and the press table respectively. At both the press plunger and at the press table, at least one positioning device is provided by which the position of the upper tool part at the press plunger and the position of the lower tool part at the press table can be set exactly. The positioning devices are hydraulic positioning plugs. If an adjustment gauge is used, the hydraulic positioning plugs can be set at the press plunger and the press table so that subsequently, the tool halves can be mounted without further adjustment in accurate positions and reproducibly at any time.

12 Claims, 6 Drawing Sheets

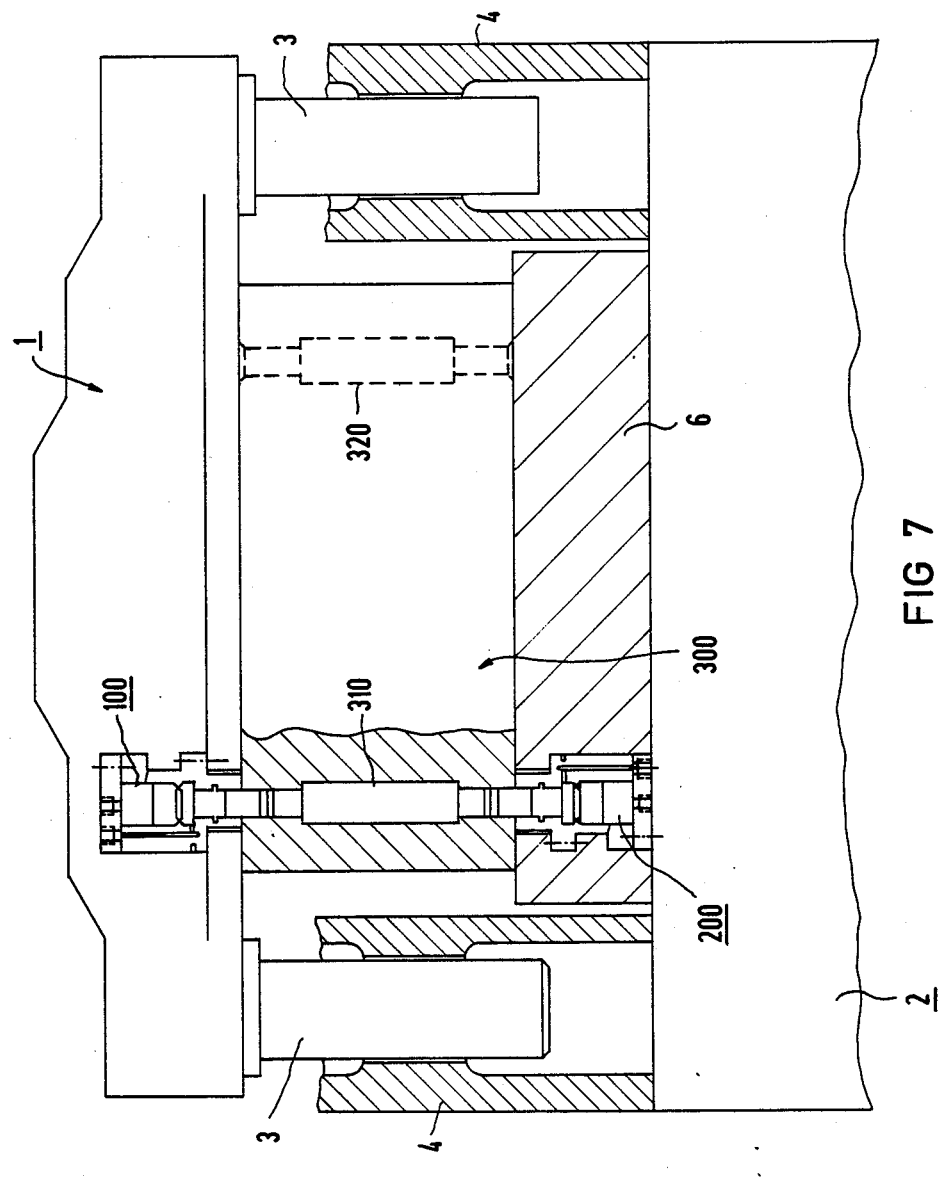

AUTOMATIC PRECISION STAMPING PRESS AND METHOD FOR CHANGING TOOLS

FIELD OF THE INVENTION

The invention relates to the field of automation precision stamping presses with exchangeable tools, and to an operating method for changing tools in an automatic precision stamping press.

BACKGROUND OF THE INVENTION

In stamping technology, stamping tools are used which essentially comprise an upper tool part and a lower tool part. Into these tool halves, the forming parts, the punch and the die, are arranged. Between the forming parts, a material to be processed as semifinished material is stressed beyond its yield point with the objective being to manufacture a given number of identical work pieces from it. The manufacturing accuracy of these work pieces produced by forming and cutting depends on the shape and the dimensional accuracy of the tool. In addition to the accuracy of the stamping tool achieved in production, however, the shape and dimensional accuracy of the stamped parts are also determined by the manner in which shear forces occuring during the stamping are taken up. Relative motions of the shaped parts in the horizontal direction relative to each other should be minimized.

In order to take up shear forces which occur in the stamping operation and which can lead to relative horizontal relative motions of the tool parts, stamping tools in the past have been equipped with guides for the tool halves which hold the forming parts. By these guides, the tool halves were likewise positioned relative to each other.

Of these known tools, there are at least three types: tools with plate guidance; tools with column guidance; and tools with changing frames.

Tools with plate guidance have a guiding plate firmly connected to the lower part of the tool which takes over the guidance of the punch and the positioning of the tool halves. In these tools, the punches must not leave the guiding plate due to the press stroke.

Tools with column guidance are constructed either from a column frame or from plates into which the columns are worked. In this way, the guidance and positioning of the tool halves are transferred to two or more columns. In addition to the tool guidance, the design can be further completed by a spring-loaded punch guiding plate within the tool, especially in composite sequential tools with large shear forces.

Tools with changing frames have their exchangeable tool halves inserted into a changing frame which takes over guidance and positioning. Accurate correlation of the tool halves and thereby the forming parts is provided only in the changing frame.

In all of the above known tools, however, the comparatively large amount of technical means, corresponding with high tool costs, is a problem.

Besides guided tools, so called guideless tools are also already known. In guideless tools, the separate tool halves are not themselves guided (i.e. constrained by guiding posts, for example). Rather, only the press table and press plunger are guided. In German Patent 27 11 696 a precision cutting tool with a movable plunger and a fixed table for punch preses for cutting-out sheet metal parts is described. The active tool part (the punch and the cutting plate) are accurately guided relative to each other by at least two closed linear guides which are arranged outside the tool and are in engagement near the operating plane. Each linear guide has two elements, a guiding column in a guiding sleeve, and one of these elements is connected to the plunger and the other one to the table. Such a stamping tool can supplement an automatic stamping press according to German published Unexamined patent application 22 41 639.

It is, however, a problem with the above-mentioned guideless tools to adjust the tool halves when setting tools for the first time or when changing tools. This could be done only by specially trained personnel, so that to date, such guideless tools have not found wide acceptance in practice.

It is therefore an object of the invention to provide an automatic precision stamping press in which guideless tools can be used and exchanged without problem.

This and other objects are achieved by the present invention by providing an automatic stamping press comprising a press plunger, a press table and an exchangeable guideless tool having separate tool halves with an upper tool fastenable to the press table. Guiding columns and corresponding guiding sleeves accurately guide outside the tool halves the press plunger and the press table. There are separate mounting plates, with the tool halves being respectively fastened to one of the mounting plates. Positioning devices engage the mounting plates, with at least one positioning device for each mounting plate operating to respectively position the upper tool part at the press plunger, and the lower tool part at the press table. The positioning devices are hydraulic clamping plugs that are arranged on a diagonal of each of the mounting plates. Also provided is a method for operating the automatic precision stamping press.

It is important to have a diagonal mobility in the mounting plates which can take up the thermal stresses of the tool halves. This will be realized alternatively by an oval cross-section of one of the hydraulic clamping plugs or a slide element which is movable in the diagonal direction. Latter could be a dove-tail or a lever with a roller-bearing free from backlash on which the plug is linked.

By the invention, the accuracy of plunger guidance of the automatic precision stamping press is now utilized for the first time. Thereby the guidance of the stamping tools can be replaced by the guidance of the press plunger consisting of guiding columns and guiding sleeves as compared to the press table, which is already known per se but has not found acceptance in practice because of the time-consuming positioning.

On the other hand, an automatic stamping press is provided by the invention having a positioning and clamping system which permits clamping of the two tool halves of the guideless tools so exactly that the guiding behavior of the plunger is fully transferred to the tools. Thereby, the problem is solved as to how the tool halves containing the forming parts can be positioned relative to each other in a machine tool which generates the cutting and deformation forces and takes up the shear forces occurring in the process, and thereby the relative motion mentioned at the outset can be minimized in cooperation with the features of the machine tool. A tool change can now be performed with extremely short machine shutdown times.

BRIEF DESCRIPTION OF THE DRAWINGS

FIG. 3A shows a positioning plug having an oval cross section;

FIG. 3B shows a positioning plug having a round cross section;

FIG. 7 is a view corresponding to FIG. 1 without a tool, but with a corresponding adjustment gauge.

DETAILED DESCRIPTION

Figure 1:
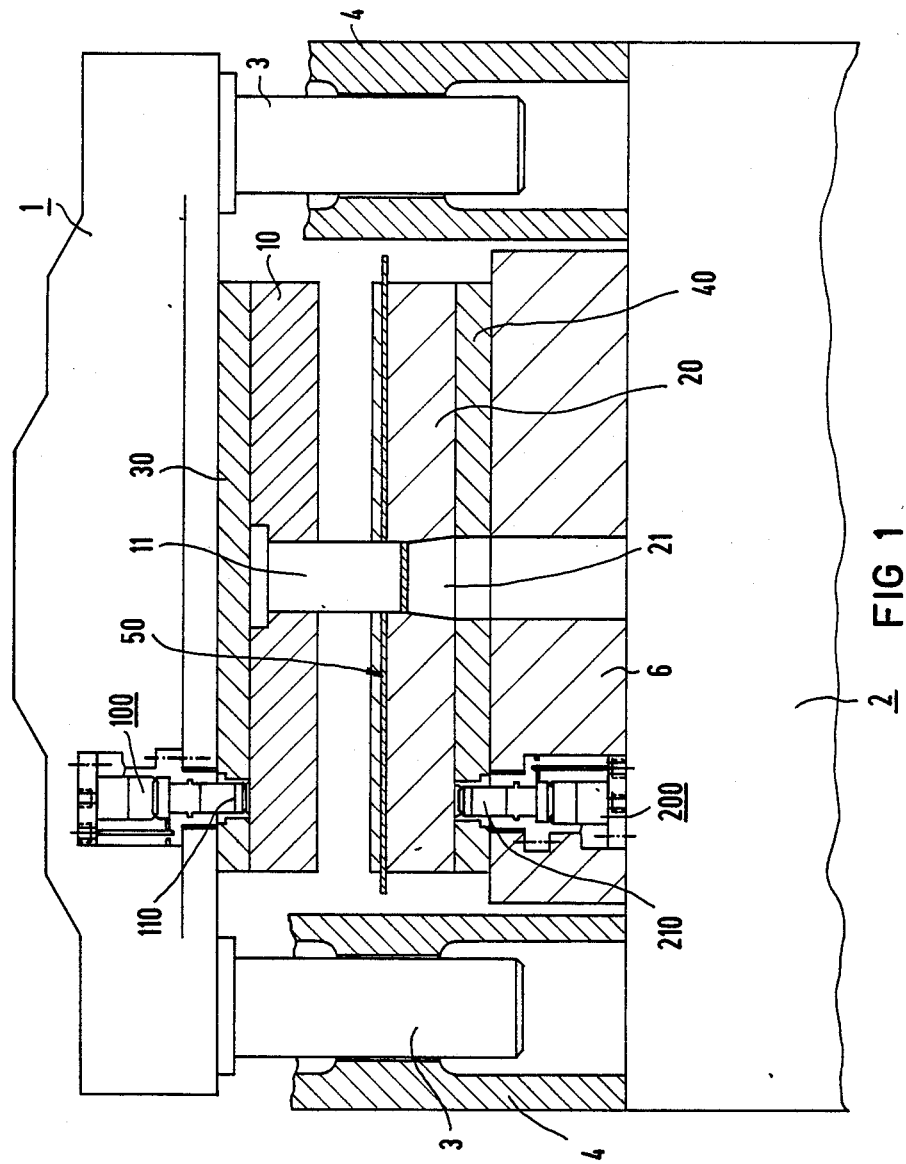
FIG. 1 is a cross section of part of an automatic stamping press with a press plunger, press table and tool.

In the figures, identical parts are provided with the same reference numerals.

In FIG. 1, a press plunger 1 and a corresponding press table 2 of an automatic precision stamping press are accurately guided via guiding columns 3, which engage guiding sleeves 4. Between the plunger 1 and the table 2, a tool comprising an upper tool part 10 and a lower tool part 20 is arranged. The upper tool part 10 is connected by a mounting plate 30 to the plunger 1. The lower tool part 20 is connected to an intermediate part 6, that is itself connected to the mounting plate 40. A cutting plunger 11 which engages a suitably designed cutting die 21 of the lower tool part 20 is integrated into the upper tool part 10. A continuous strip 50 is shown which serves as the semifinished material for the work pieces to be manufactured.

A guideless tool of the type described having a press table and press plungers which are guided by sliding guides is known from German patent 27 11 696. In the present invention, the upper tool part 10 is connected to the press plunger 1 by positioning devices 100 and similarly, the lower tool part 20 is connected to the press table 2 by positioning devices 200. In each tool half, two mutually offset positioning devices 100 and 100', 200 and 200' are provided, of which only one is visible in the cross-sectional view. The positioning devices 100 and 200 of the two halves are arranged with mirror symmetry to each other.

Figure 2:
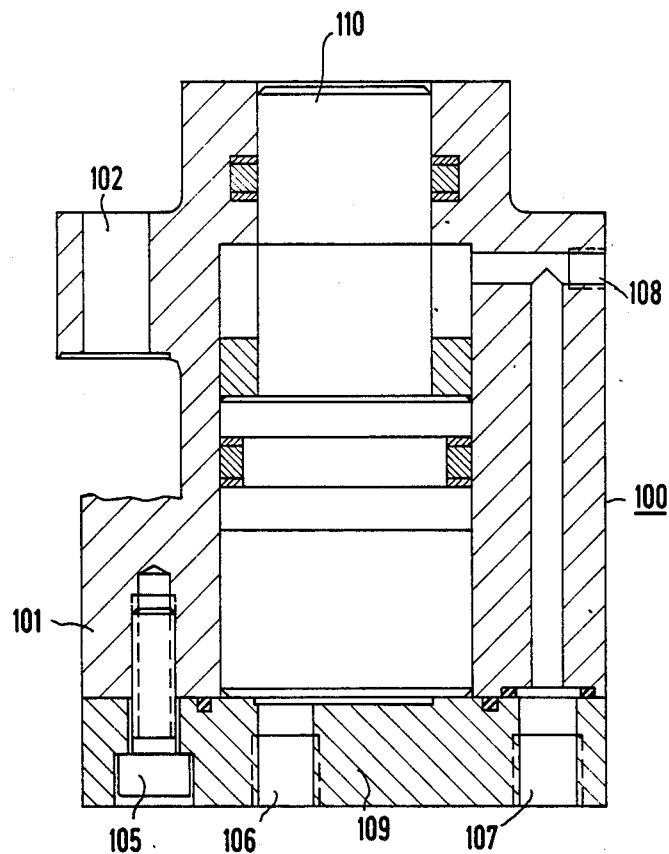
FIG. 2 is an enlarged view of the positioning apparatus used in FIG. 1.

A positioning device 100 according to FIG. 2 comprises a base body 101 with a hole 102 for adjustment and contains a hydraulic clamping plug 110. Such hydraulic clamping plugs are known in machine tool technology. These hydraulic clamping plugs are used since the cross section of these pins or plugs can be varied by the supply of pressure medium in order to ensure detachable clamping. Different pressure medium lines 106, 107 and 108 for supplying the pressure medium are indicated in FIG. 2 in the base body 101. The base body 101 is sealed with a lid 109 by screws 105.

Figure 3:
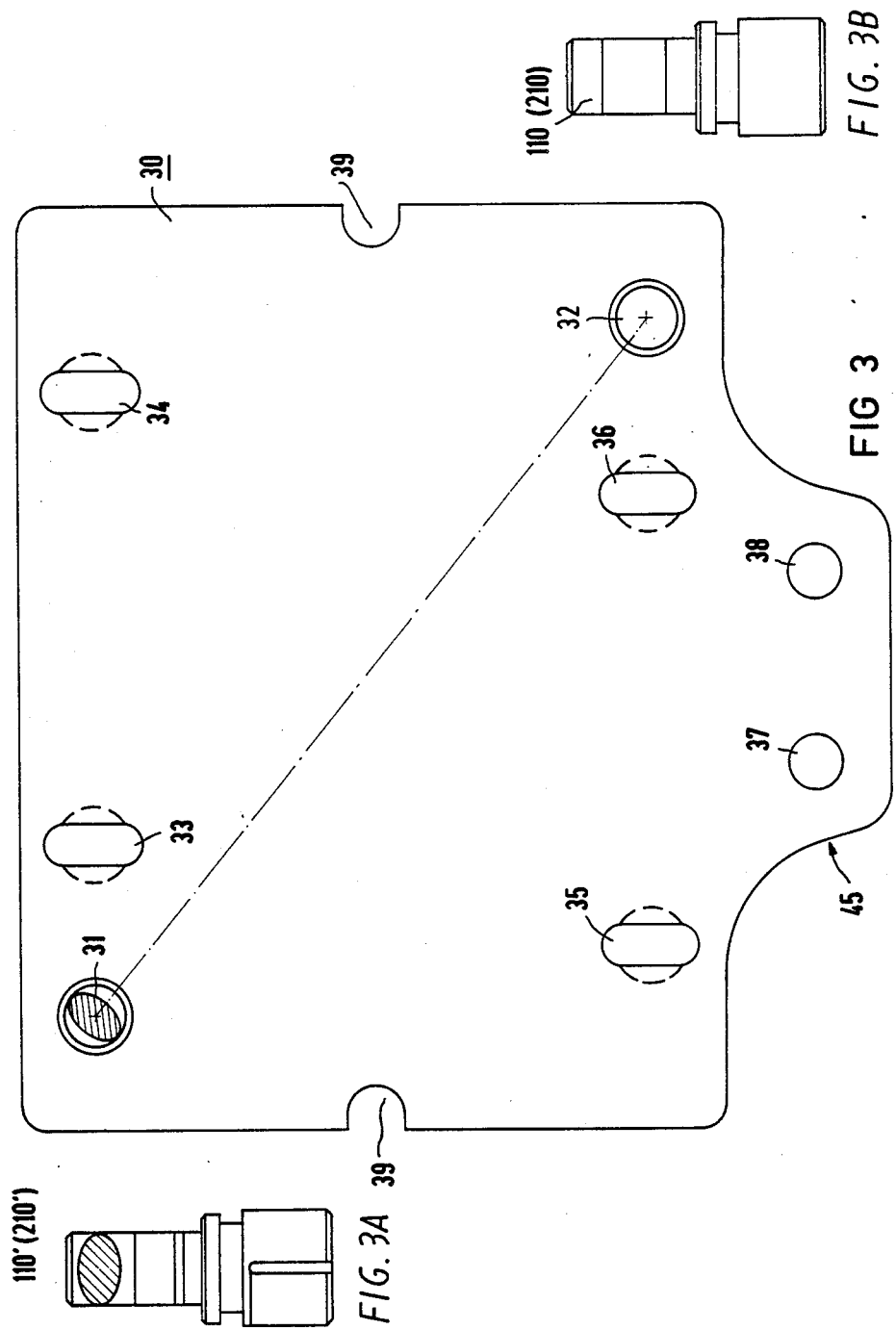
FIG. 3 is a top view of a mounting plate used in FIG. 1.

In FIG. 3, the mounting plate 30 which is basically rectangular in top view comprises two holes 31 and 32 offset diagonally for engagement of the adjustment plug 110 shown in FIG. 2. Furthermore, four holes 33 to 36 are provided, asymmetrically distributed, for clamping elements 60 explained in detail later in FIGS. 6a and 6b. The mounting plate 30 has on the front side a trapezoidal extension 45 in which two further holes 37 and 38 are made. These holes serve for the engagement of a handling device for changing tools, which will not be discussed in detail here.

FIG. 7 shows an adjustment gauge 300 inserted instead of a tool in an automatic precision stamping press according to FIG. 1. The adjustment gauge 300 comprises a metallic block which has the functional dimensions of a stamping tool that is engaged, and has two through holes 310 and 320.

In the following paragraphs, the interaction of the tools modified by the positioning units will be discussed.

It can be seen from FIG. 1 in conjunction with FIG. 3, that for each tool half 10 and 20, respectively, two positioning devices 100, and 100' and 200, 200' are used. These positioning devices are arranged in the diagonals of the tool mounting plates 30 and 40. All of the positioning devices 100, 100' and 200, 200' are built with their base unit into the press plunger 1 or the press table 2, and serve for the positioning of the upper tool part 10 on the table 2.

The functional parts of the positioning devices 100, 100' and 200, 200' are the positioning plugs 110 and 110' and 210, 210' which include pistons in hydraulic cylinders. The positioning plugs 110, 110' are first arranged flush with the clamping surfaces at the plunger 1 of the press and are then inserted from above into the upper mounting plate 30. The positioning plugs 210, 210' are also arranged flush with the clamping surfaces at the table 2 of the press and then inserted from below into the lower mounting plate 40. The positioning of the tool takes place by increasing the circumference of that part of the plug 110, 110' and 210, 210' which is immersed in the mounting plates 30 and 40 in the region of the clamping surfaces. By the hydraulically generated widening and the dimensional fit produced thereby, the position of the guiding sleeve of the positioning plugs 110, 110', 210 and 210' in the clamping surface is transferred exactly to the sleeve in the mounting plate 30 or 40 to be positioned.

The mounting plate 30 or 40 with the upper or lower tool part is positioned on two positioning points by plugs 110 and 110' or plugs 210 and 210'. In positioning it is important that always only one plug 110 or 210 with a round cross section and therefore a round circumference is positioned at its entire circumference in the clamping surface of the plunger 1 or the table 2 of the press and in the mounting plates 30 and 40, while the other plug 110' and 210' is positioned only in the clamping surfaces of the plunger 1 or the table 2 of the press. For this purpose, an extension of the centering diameter of the two plugs 110' and 210' which position only in the clamping surfaces of the plunger 1 or the table 2 is made with an oval cross section and cannot be expanded. The longest diameter of the oval cross section corresponds to the round cross section of the sleeve. The shortest diameter of the oval cross section lies in the diagonal of the mounting plate 30. The contact line between the oval cross section of the plug 110' and the round cross section of the sleeve 31 should cross only a vertical alignment towards the diagonal of the mounting plate 30, which are defined through the two positioning points. Thereby, unevenly tempered tool and machine plates can be positioned without the production of a forced stress by the thermal expansion due to a temperature equalization. Thereby a linear mobility of the mounting plates 30 and 40 in the direction of their diagonals is ensured, because of the oval cross section and the round cross section.

From a production point of view, the radii of the oval part of the positioning plugs 110' and 210' as well as the holes 31 to be positioned in the mounting plate 30 and 40 are matched to each other. This matching is done in such a manner that thermal expansion in the direction of the diagonal divided into length changes in the running direction of the strip and perpendicularly to the running direction of the strip, does not exceed about 10% of the customary cutting gap dimensions including the necessary play between the two elements in engagement with each other.

Figure 4:
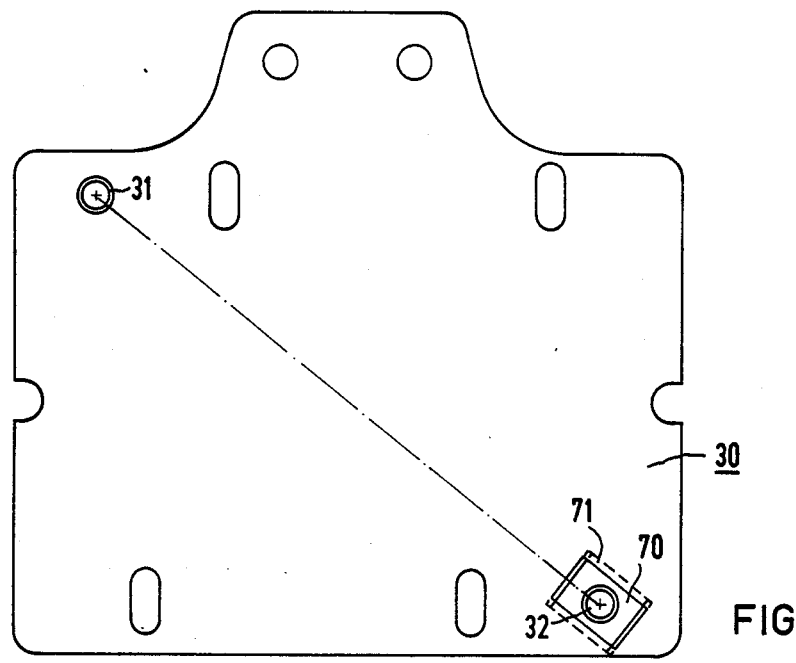
FIGS. 4 and 5 illustrate different embodiments of positioning pin supports for the positioning pins of FIG. 3.
Figure 5:
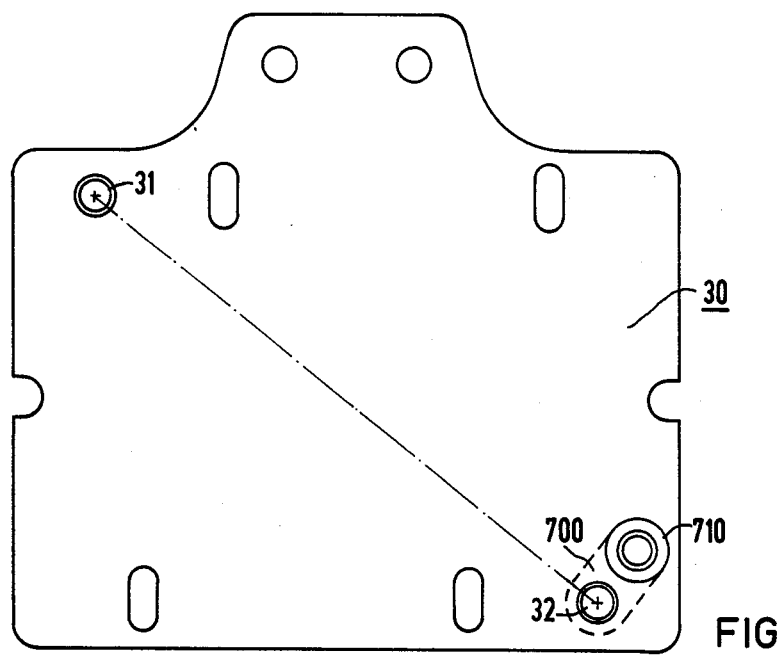

The linear mobility of the mounting plates 30 and 40 in the direction of their diagonals can also be ensured by the embodiments illustrated FIGS. 4 and 5 which describe alternatives to the embodiment of FIG. 3.

In FIG. 4, a slide element 70 is shown, which lies in the direction of the diagonal of the mounting plate 30 or 40. The slide element 70 allows therefore a mobility in this direction by small forces. Preferably the sliding element 70 can be realized as a dove tail guide 71 and the mounting plate 30, with the dove-tail guide 71 with its close sliding fit extending in the diagonal direction.

In FIG. 5, a roller bearing 710 is mounted on the plunger 1 or the table 2 of the press. The roller bearing 710 carries a lever 700 which in turn can take up one of the two clamping posts 110, 210. The roller bearing 710 is arranged at a distance from the diagonal, so that tilting lever 700 permits a substantial linear motion of the clamping plug 110, 210 along the diagonal of the mounting plate 30 or 40.

The positioning achieved by the two embodiments in FIGS. 4 and 5 occurs under the same play conditions as in FIG. 3 via an area contact. In these alternate embodiments, wear phenomena such as might occur with oval clamping plugs are avoided. (In the case of the clamping post 110' and 210', line contact takes place because of the oval shape, whereby the surface of the oval region is subjected to increased wear.)

Figures 6A, 6B:
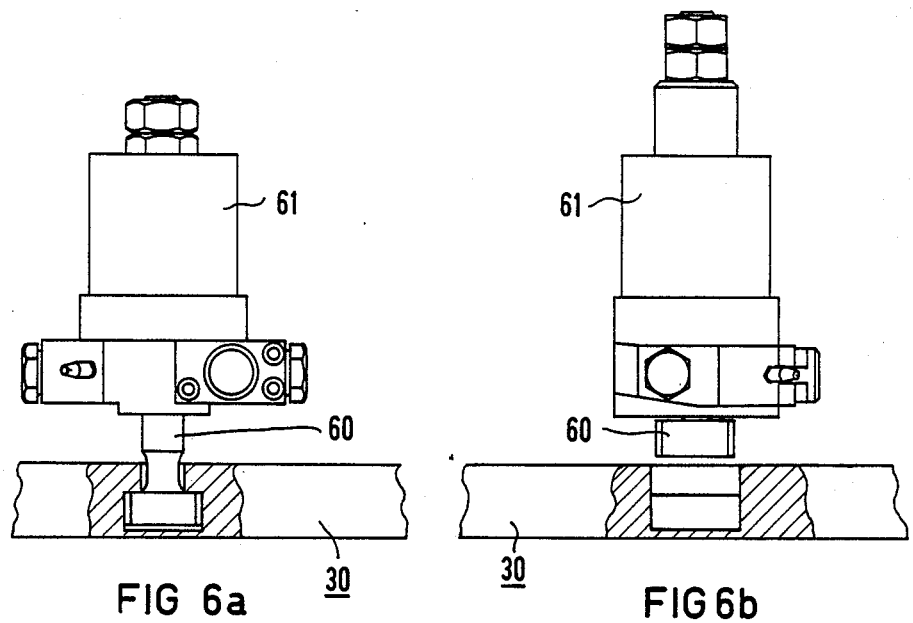
FIGS. 6a and 6b show a tensioning element in the tensioned and released conditions.

In FIGS. 6a and 6b, tensioning elements 60 which are used for holding the mounting plates 30 and 40 are shown in both their clamped and detached positions. The tensioning element 60 is a T-shaped latch (as seen in cross-section). The T-shaped latch is inserted into the holes 33-36, and the mounting plates 30 and 40 are locked by a 90 rotation of the respective latches. The upper part 61 of the tensioning element 60 comprises hydraulic tensioning and rotation cylinders which will not be discussed in detail since tensioning elements per se are known to those of ordinary skill in the art.

The mounting plates 30 and 40 of the two tool halves 10 and 20 are largely of identical design, as seen in FIGS. 3-5. The mounting plates 30 and 40 in the illustrated exemplary embodiments additionally have semicircular recesses 39, arranged laterally, for securing the two tool halves 10 and 20 in receiving stations. In these receiving stations, for instance, a tool changer engages the trapezoidal extension 45 with the two holes 37 and 38 serving as the handling device.

The tensioning and clamping elements 60 shown in FIGS. 6a and 6b are commercially available hydraulic rotary tensioners. However, it is important that the hydraulic clamping pressure of the individual asymmetrically offset tensioning elements 60 can be set separately. This is to allow the high clamping pressure at the tensioning element in the vicinity of that positioning plug which positions the clamping surface and the mounting plate, to fix the mounting plate 30 relative to the clamping plate. It also permits thermal expansion in the direction of the diagonal without stress by low clamping pressure in the vicinity of that positioning plug which positions only perpendicularly to the diagonal.

In order to make the above-described exact positioning of the two tool halves 10 and 20 by the guide columns 3 and guide sleeves 4 of the press plunger 1 and the press table 2 independent of wear phenomena or readjustments at the press as well as other external influences, it is advisable to provide adjustability of the positioning elements in the clamping surfaces. This purpose is served by an adjustment gauge 300 shown in FIG. 7. Prior to the first use of a guideless tool or after changes at the plunger guide, the positioning plugs 110, 110' and 210, 210' at the plunger 1 and the table 2 are aligned with this gauge 300. To this end, the clamping screws of the cylinders and/or of the guiding sleeves of the positioning devices 100, 100' and 200, 200' in the clamping surfaces are loosened and the adjustment gauge 300 is aligned in the press setting room with ground stop strips in the press table 2. The positioning plugs 110, 110' and 210, 210' of the positioning devices 100, 100' and 200, 200' are then inserted from both sides into the through holes 310 and 320 of the gauge 300 and are expanded. In this condition, the clamping screws of the cylinders and/or of the guiding sleeves are tightened and the positioning devices are thereby fixed. Therefore, the dimensions of the distance of the positioning devices, copied exactly by the adjustment gauge 300, can be transferred to the tools clamped subsequently.

After the described one-time adjustment, the tool halves 10 and 20 of the guideless tools can be guided via the plunger guide of the press without further adjustment, with exact positioning and reproducible at any time, and clamped there. Thereby, an extremely fast tool change allowing flexible production is possible so that the machine shutdown times are minimized.

What is claimed is:

1. An automatic precision stamping press comprising:
a press plunger;
a press table;
an exchangeable guideless tool having separate tool halves with an upper tool fastenable to said press table;
guiding columns and corresponding guiding sleeves for accurately guiding outside said tool halves the press plunger and the press table;
separate mounting plates, said tool halves being respectively fastened to one of said mounting plates, said mounting plates having diagonals extending between corners of said mounting plates;
positioning devices engaged with said mounting plates, with exactly two positioning devices for each mounting plate operating to respectively position said upper tool part at said press plunger, and said lower tool part at said press table;
wherein said positioning devices are hydraulic clamping plugs that are arranged on a diagonal of each of said mounting plates; and
wherein a first one of the two hydraulic clamping plugs for each said mounting plate includes means for permitting mobility of the mounting plates extending in a direction of the diagonal of said mounting plates.

2. An automatic precision stamping press according to claim 1, wherein said first hydraulic clamping plug for each mounting plate has toward the mounting plate a round cross-section, and a second hydraulic clamping plug has an oval cross-section toward the mounting plate.

3. An automatic precision stamping press according to claim 1, further comprising a slide element mounted in said mounting plate and movable in the diagonal direction, and coupled to said first hydraulic clamping plug.

4. An automatic precision stamping press according to claim 3, wherein said slide element is a dove-tail guide which is movable in the diagonal direction.

5. An automatic precision stamping press according to claim 1, further comprising a lever and a roller bearing mounted on one of said press plunger or said press table which can be tilted via said lever, said first hydraulic clamping plug being linked articulatedly to said roller bearing.

6. An automatic precision stamping press according to claim 1, wherein said mounting plates include means for handling the tool halves for at least one of a change of tools and transport.

7. An automatic precision stamping press according to claim 6, wherein said handling means include engagement means for handling devices.

8. An automatic precision stamping press according to claim 1, further comprising an adjustment gauge mounted between said press plunger and said press table for adjusting said positioning devices.

9. An automatic precision stamping press according to claim 8, wherein said adjustment gauge is a block which has the functional dimensions of said tool halves when engaged and includes two through holes.

10. An automatic precision stamping press according to claim 1, further comprising a plurality of clamping elements associated with each said mounting plate for fixing positioning tool halves at the press plunger and the press table, respectively.

11. An automatic precision stamping press according to claim 10 wherein said clamping elements are arranged asymmetrically in a plane of each of said mounting plates.

12. An automatic precisiion stamping press according to claim 11, wherein said clamping elements are hydraulic rotary tension tighteners which are separately settable to different tightening pressures.

* * * * *

UNITED STATES PATENT AND TRADEMARK OFFICE
CERTIFICATE OF CORRECTION

PATENT NO. : 4,912,960
DATED : 3 April 1990
INVENTOR(S) : Joseph KROENER et al.

It is certified that error appears in the above-identified patent and that said Letters Patent is hereby corrected as shown below:

IN THE ABSTRACT:

Change "[73] Assignee: Siemens Aktiengesellschaft, Berlin and Munich, Fed. Rep. of Germany" to
--[73] Assignees: Siemens Aktiengesellschaft, Munich, Federal Republic 7, Germany
Bruderer Aktiengesellschaft, Frasnacht, Switzerland Signed and Sealed this Twenty-eighth Day of April, 1992

*Attest:*

HARRY F. MANBECK, JR.

*Attesting Officer*     *Commissioner of Patents and Trademarks*